United States Patent
Nehl et al.

(10) Patent No.: US 9,692,266 B2
(45) Date of Patent: Jun. 27, 2017

(54) SPOKE-TYPE PM MACHINE WITH BRIDGE

(71) Applicant: GM GLOBAL TECHNOLOGY OPERATIONS LLC, Detroit, MI (US)

(72) Inventors: Thomas W. Nehl, Shelby Township, MI (US); Lei Hao, Troy, MI (US); Rajeev Vyas, Rochester Hills, MI (US); Chandra S. Namuduri, Troy, MI (US); Michael G. Reynolds, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 465 days.

(21) Appl. No.: 14/337,833

(22) Filed: Jul. 22, 2014

(65) Prior Publication Data

US 2016/0028280 A1   Jan. 28, 2016

(51) Int. Cl.
*H02K 1/27* (2006.01)
*H02K 1/24* (2006.01)

(52) U.S. Cl.
CPC ......... *H02K 1/2773* (2013.01); *H02K 1/2766* (2013.01); *H02K 1/246* (2013.01); *H02K 1/276* (2013.01)

(58) Field of Classification Search
CPC ...... H02K 1/2766; H02K 1/246; H02K 1/276; H02K 1/2773
See application file for complete search history.

(56) References Cited

U.S. PATENT DOCUMENTS

| | | | |
|---|---|---|---|
| 6,555,940 B2* | 4/2003 | Naito | H02K 1/2766 310/156.55 |
| 8,004,140 B2* | 8/2011 | Alexander | H02K 1/2773 310/156.48 |
| 2011/0316378 A1* | 12/2011 | Matt | H02K 1/2773 310/156.53 |

* cited by examiner

*Primary Examiner* — Dang Le
(74) *Attorney, Agent, or Firm* — Quinn IP Law

(57) ABSTRACT

A rotor of a permanent magnet synchronous machine includes a rotor core structure. A first set of apertures are formed in a first radial layer of the rotor core structure having a first set of permanent magnets disposed therein forming respective poles. A second set of apertures formed in a second radial layer of the rotor core structure of each pole. A third set of apertures is formed in a third radial layer of the rotor core structure. A second set of permanent magnets is inserted within the third set of apertures. A plurality of bridges each extends across a respective side of each of the third set of apertures in the third radial layer. The plurality of bridges provides structural support of the rotor core structure when operating. The plurality of bridges are integrally formed as single-piece laminations.

23 Claims, 7 Drawing Sheets

US 9,692,266 B2

SPOKE-TYPE PM MACHINE WITH BRIDGE

BACKGROUND OF INVENTION

An embodiment relates generally to permanent magnet motors.

A permanent magnet synchronous motor is an AC motor in which the rotation rate of the shaft is synchronized with the frequency of the AC supply current. A rotating electric field is generated in the stator and the rotor follows the rotating electrical field of the stator. The rotor rotates in step with the field of the stator at a same rate. The rotor and the stator are said to be in synchronization.

The permanent magnets used in conventional rotors are configured to provide a specified alternating magnetic field distribution in the air gap. In an effort to reduce the amount of rare-earth magnets, some machines utilize a permanent magnet assist synchronous reluctance machine structure utilizing cheaper ferrite magnets. These machines are constructed using straight or curved permanent magnets embedded in the rotor core with as many as 8 to 10 magnets per pole requiring up to 5 different sets of tooling.

Another approach to reducing the amount of rare-earth magnets is to use a conventional spoke-type rotor construction. However, the rotor structure for a conventional spoke-type rotor is a multi-piece construction utilizing a plurality of individual components to assemble and couple the rotor structure together particularly using pins and rods to reduce mechanical stress encountered during elevated speed operations of the motor.

SUMMARY OF INVENTION

An advantage of the invention described is the spoke-type lamination rotor design which simultaneously achieves high performance with a simple and inexpensive rotor core structure for high speed operation. The rotor core structure utilizing a plurality of single one-piece laminations which reduces parts count and simplifies the mechanical structure and reduces cost for high speed operation. Unlike conventional spoke-type motors where the rotor lamination is a multi-piece construction utilizing pins and end caps to hold the together the rotor structure, the structure of the rotor utilizes a bridge around the magnets to maintain structural integrity of the one piece lamination. The bridge also accommodates the use of different magnets which minimizes magnet cost. Utilizing simple magnet shapes allows for fewer magnet pieces compared to those motors used in permanent magnet synchronous reluctance (PMA SynRel) machines which can use from two to eight or more magnets per pole and have unconventional shaped magnets. Moreover, utilizing a conventional shape and sized magnet reduces assembly cost waste particularly in regards to scrap costs from broken magnets during assembly due to complex and non-robust shapes of the magnets.

An embodiment contemplates a rotor of a permanent magnet synchronous machine. A rotor core structure includes a plurality of stacked laminations. A first set of apertures is formed in a first radial layer of the rotor core structure. A first set of permanent magnets is inserted within the first set of apertures forming respective poles within the rotor core structure. A second set of apertures is formed in a second radial layer of the rotor core structure. Each pole includes an aperture from the second set of apertures. The second set of apertures is formed radially inward from the first set of apertures. A third set of apertures is formed in a third radial layer of the rotor core structure. The third set of apertures is formed radially outward from the first set of apertures. A second set of permanent magnets is inserted within the third set of apertures. A respective pair of permanent magnets within a pole cooperatively generates a magnetic field in a same direction within the pole. The magnetic field generated by a pair permanent magnets in a respective pole is opposite to a magnetic field generated by permanent magnets in an adjacent pole. A plurality of bridges each extends across a respective side of each of the third set of apertures in the third radial layer. The plurality of bridges providing structural support of the rotor core structure when operating. The plurality of bridges being integrally formed as single-piece laminations.

DETAILED DESCRIPTION

Figure 1:
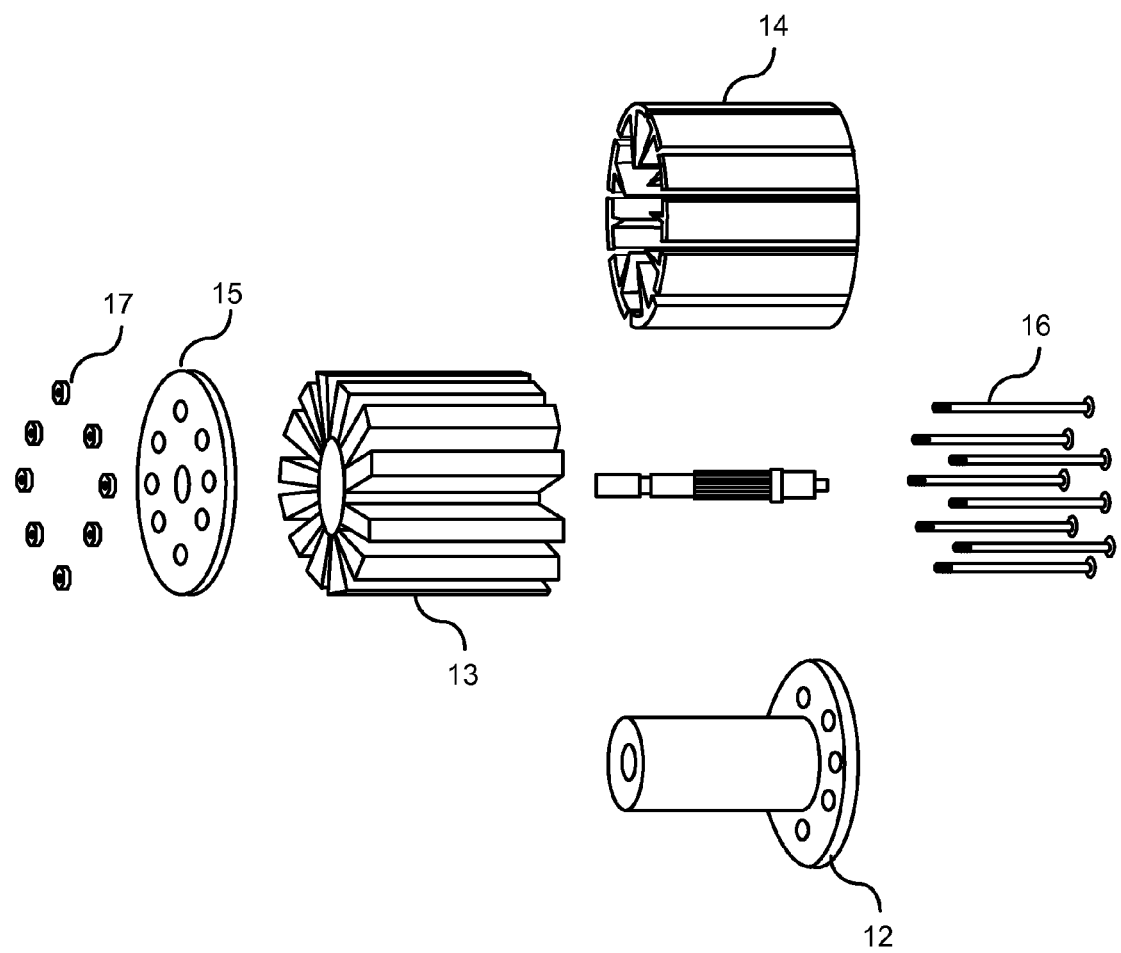
FIG. 1 is an exemplary expanded view of a conventional spoke-type prior art rotor assembly.

FIG. 1 illustrates an expanded view of a conventional rotor used in an electric motor synchronous machine as is known in the art. The conventional spoke-type rotor is a multi-piece rotor. The rotor includes a bobbin 12 with an integrated endcap on a first end of the bobbin 12. A plurality of individual magnets 13 is assembled into a like number of laminated steel pole assemblies 14 to form a rotor magnet/core assembly. The laminated steel pole assemblies 14 include disconnected individual steel pole pieces spaced between each set of adjacent magnets. The magnet/core assembly is inserted onto the bobbin 12. A second endcap 15 is coupled to the second end of the bobbin 12 and is secured together using a plurality of pins 16 that extend through the endcaps and the magnet/core assembly 14. The pins 16 are secured using fasteners 17. As a result, the conventional spoke-type motor is a multi-piece rotor structure requiring a plurality of parts for assembly.

Figure 2:
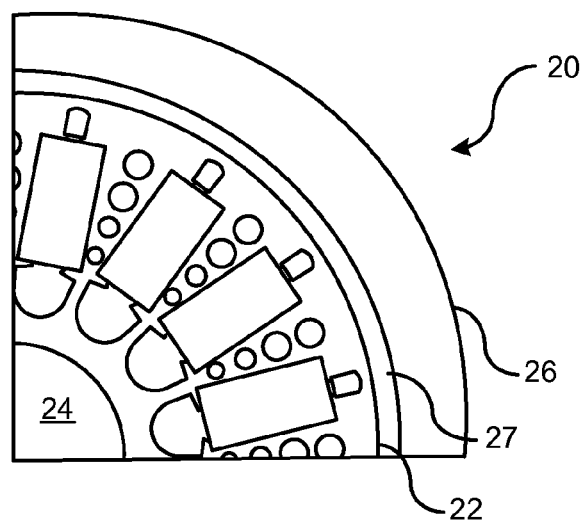
FIG. 2 is a section view of a rotor utilizing two-piece permanent magnets according to a first embodiment.

There is shown in FIG. 2 a sectional view of a permanent magnet motor 20. The permanent magnet motor 20 includes a rotor 22 coupled to a shaft 24. The rotor 22 can include any number of poles (e.g. 2, 4, 6, etc). A stator 26 is radially offset from the rotor 22 and is separated therefrom by an air gap 27.

The function of the rotor 22 is to drive a component coupled to the shaft 24. The stator 26 when excited by an excitation voltage (e.g., 3-phase supply) generates a rotating magnetic field within the motor 20. The rotor 22, which functions as a permanent magnet, locks in with the rotating magnetic field generated by the stator 26. The rotor 22 rotates along with the rotating magnetic field generated by the stator 26. When the rotor 22 locks in with the rotating magnetic field, the motor 10 is in synchronization.

Figure 3:
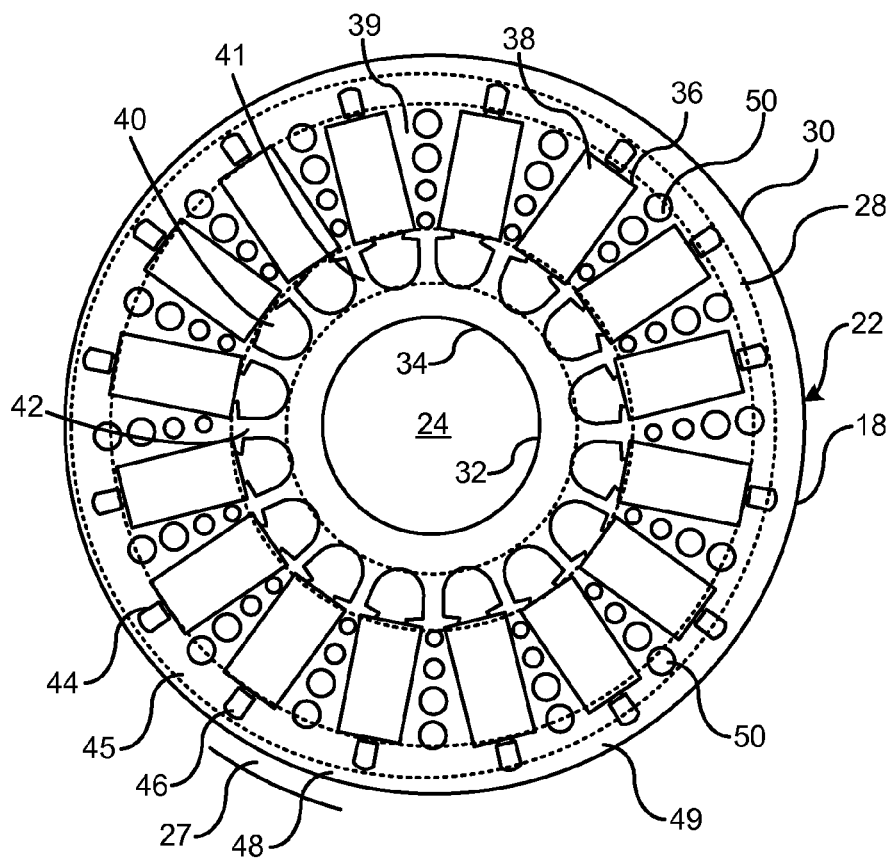
FIG. 3 is a top view of a rotor configuration according to the first embodiment.

Referring to FIGS. 2 and 3, the rotor 22 includes a plurality of single piece spoke-type laminations 28 that are stacked and secured to the shaft 24. Typically, the plurality of spoke-type laminations 28 includes a circular shape of a respective diameter with an outer circumference wall 30 and an inner circumference wall 32. The inner circumference wall 32 forms a center aperture 34 in which the shaft 24 is inserted through the center aperture 34 and the plurality of spoke-type laminations 28 are press fit onto the shaft 24.

The rotor 22 includes a first set of apertures 36 for receiving a first set of permanent magnets 38 (e.g., ferrite). The first set of apertures 36 are preferably rectangular shaped; however, the size and shape of the first set of apertures 36 are dictated by the size and shape of the permanent magnets inserted therein. The shape and size of the first set of permanent magnets 38 is selected based on magnetic field required, and also the size and shape desired for manufacturing assembly and robustness of the motor.

The first set of apertures 36 extend within a middle radial layer 39. The first set of apertures 36 are circumferentially spaced within the middle radial layer 39 between the shaft 24 and the stator 26.

The rotor 22 further includes a second set of apertures 40. The second set of apertures 40 is an extension of the first set of apertures 36. The second set of apertures 40 are formed on a respective side of the first set of apertures 36 closest to the center aperture 34 in an inner radial layer 41. The second set of apertures 40 is typically void of any permanent magnets thereby creating air gaps with the rotor 22.

Figure 4:
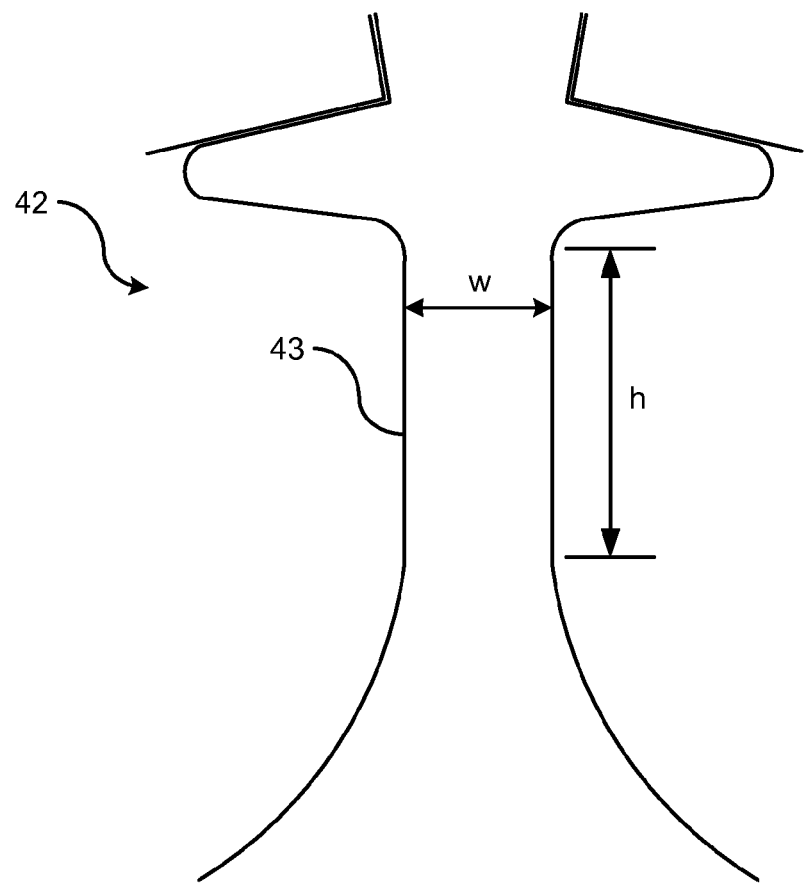
FIG. 4 is an enlarged section of a single spoke.

The second set of apertures 40 are shaped so that spokes 42 are formed between adjacent apertures 40. The spokes 42 connect the active rotor structure to the shaft. FIG. 4 illustrates an enlarged section of the spoke structure. Each spoke 42 must be at least a respective length to block flux passing therethrough and is preferably rounded at both ends and transition points to reduce mechanical stress. A base 43 of each spoke is substantially rectangular shaped that is defined by a respective width (w) and length (l). Preferably, the width of the spoke is between 1-3 mm and the length is preferably between 2-6 mm. For saturation purposes, a thinner spoke allows for greater saturation, but a wider spoke provides enhanced mechanical strength. As a result, these two parameters should be optimized to find a balance between mechanical stress and electromagnetic performance. The spokes 42 allow magnetic flux to short circuit there through; however, the spokes once saturated function as air limiting the amount of magnet flux short circuited through the spokes of the rotor 22. This respective configuration forms the spoke-type lamination.

The rotor 22, as shown in FIG. 2, further includes a third set of apertures 44. The third set of apertures 44 are an extension of the plurality of apertures 24. The third set of apertures 44 are formed on a respective side of the first set of apertures 24 closest to the outer circumference 30 in a outer radial layer 45. The third set of apertures 44 is smaller in size in contrast to the first set of apertures 36. The third set of apertures 44 includes permanent magnets 46 (e.g., rare earth magnets).

A top bridge 48 is formed between the outer circumference wall 30 of the rotor and each aperture in the third set of apertures 44 for bridging the lamination material so none of the apertures of the fourth set 44 are open to the air gap 27. The width of the top bridge 48 is preferably 2.0 mm or less. As a result, each lamination 18 is formed as a single piece structure, as opposed to a plurality of separate parts integrated together. The single-piece lamination structure using the top bridge 48 and the spoke-type lamination design maintains mechanical stress, reduces bridge saturation flux density, and allows different types of magnets to be used which can minimize the magnet costs, and increase robustness of the magnets, particularly during assembly. Moreover, the top bridge 46 reduces torque ripple of the motor. Maintaining the structural integrity for minimizing mechanical stress and reducing torque ripple utilizing the top bridge 46 is particularly useful when the motor is operating at elevated speed operations (e.g., 15,000 rpm or greater). As a result, this configuration is suitable for high speed operations while having the comparable torque and power density of a conventional motor. In contrast, a conventional motor would not be able to operate at such high speeds if pins and endplates of the multi-piece pole construction were not utilized. As a result, a single-piece construction lamination structure minimizes part cost, assembly cost, and waste cost.

Figure 5:
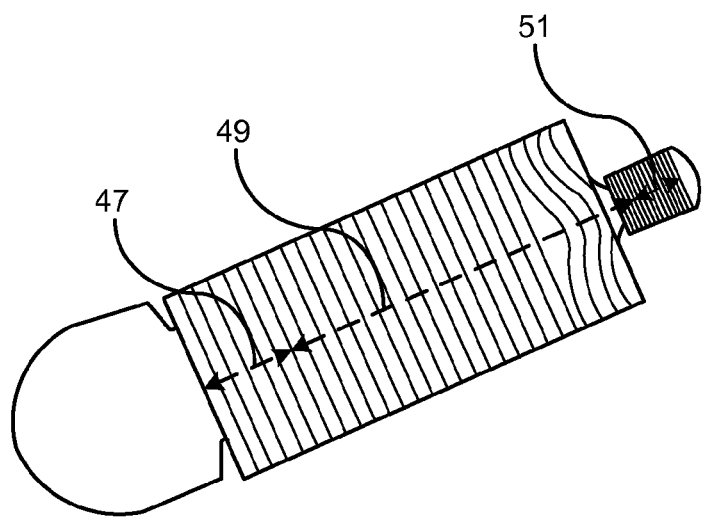
FIG. 5 is an enlarged view of a set of magnets in the motor illustrating the short circuit flux.

FIG. 5 illustrates an enlarged view of a set of magnets in the motor identifying the short circuit flux. Permanent magnet 38 (e.g., ferrite magnets) and permanent magnet 46 (e.g., rare earth magnet) inserted within their respective apertures. Element 47 represents a region of shorted flux in the permanent magnet 38, and element 49 represents a region of useful flux generated by the ferrite magnet 38 and rare earth magnet 46. Element 51 represents a region of shorted flux in the rare earth magnet 46. As shown, approximately 25% of the flux generated by the ferrite magnet 38 is shorted by a respective spoke at no load, driving it into saturation. Approximately, 60% of the flux generated by the rare earth magnet is shorted by the top bridge thereby saturating the top bridge.

Preferably, the smaller permanent magnets 46 in the outer radial layer 45 should have a high residual induction and a high demagnetization field such a neo-magnets. Residual induction (Br), also known as residual flux density, is the remaining magnetic induction after saturation and after removal of the magnet field in a closed-circuit. The demagnetizing field (H) is applied to previously full saturated magnets to generate a demagnetization curve, whereas coercivity (Hc), also known as coercive force, is the demagnetizing field required to reduce the magnetic induction to zero. The smaller permanent magnet 46 in the outer radial layer 45 may be replaced with an air pocket which lowers the costs, but reduces the power density.

Preferably, the permanent magnets of the middle radial layer 39 should be low-cost and have a low residual induction in the low coercive force (e.g., ferrite magnets).

It should be understood that each of the permanent magnets in the respective layers may vary in size and magnetic strength depending on the required torque and other factors such as inertia and flux flow. Alternatively, the permanent magnets in two or more layers may be of the same size and magnetic strength.

The rotor 22 further includes a fourth set of apertures 50 formed between the apertures of the first set 26. The fourth set of apertures 50 are formed preferably in low flux density regions of the rotor 22. The fourth set of apertures 50 reduces the rotor weight and the inertia of the rotor 22. As shown in FIG. 2, the fourth set of apertures 50 are circular shaped and extend in a radial direction; however, the fourth set of apertures 50 may include other shapes and configurations which assist with the weight reduction without impeding the flux flow for the permanent magnet motor.

Figure 6:
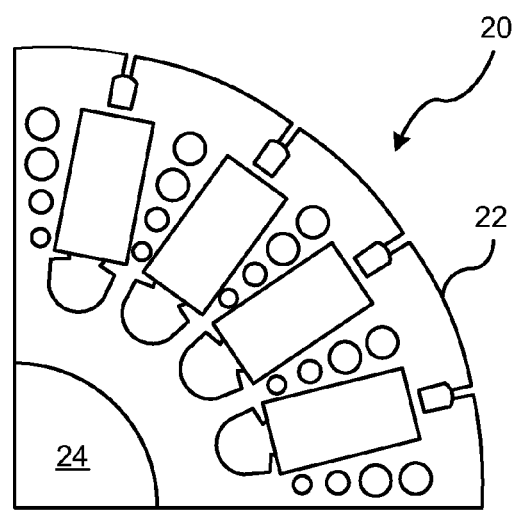
FIG. 6 is a section view of a rotor configuration according to a second embodiment.
Figure 7:
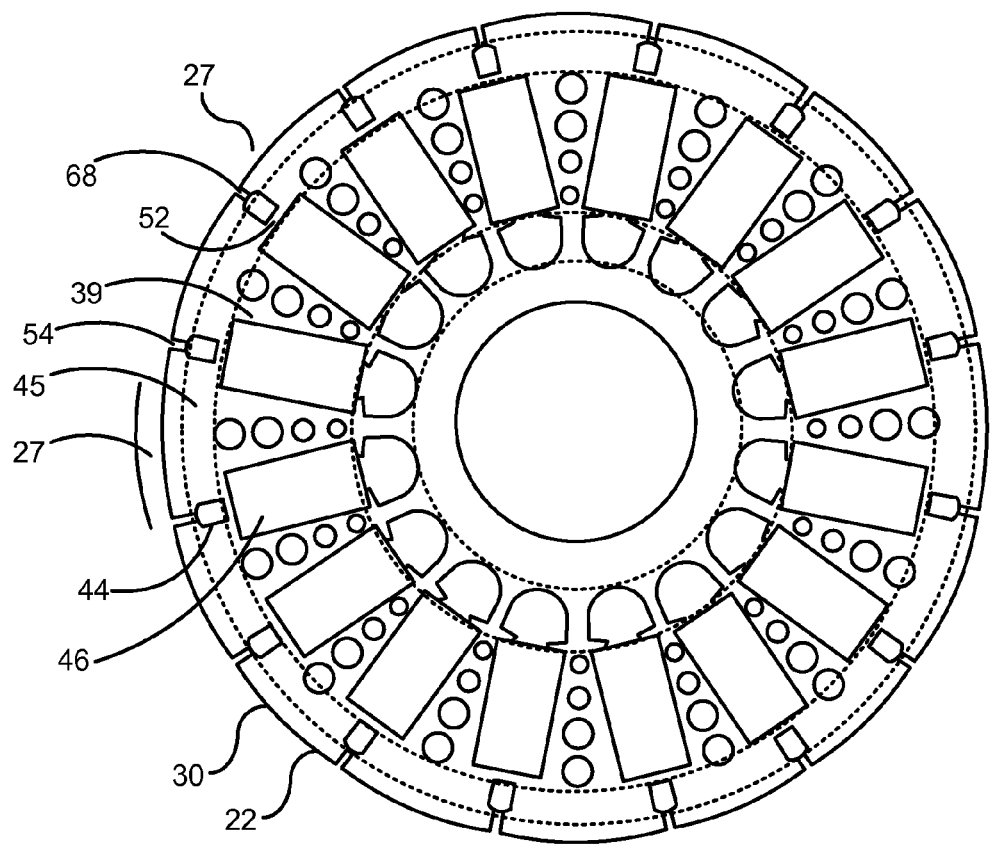
FIG. 7 is a top view of a rotor configuration according to a second embodiment.

There is shown in FIGS. 6 and 7 respective views of the permanent magnet motor 20 according to a second embodiment. The configuration is similar to the configuration shown in FIGS. 2 and 3, respectively, with the exception of the following description. It should be understood that same element numbers will be used for consistent element numbering throughout the drawings where a same element number is shown.

In FIGS. 6 and 7, an internal bridge 52 is formed between each aperture of the middle radial layer 39 and each aperture of the outer radial layer 45 for bridging the spokes and reducing mechanical stress during high speed operation. Each aperture in the third set of apertures 44 is open to the air gap 27 by utilizing an open bridge 54 extending from each of the third set of apertures 44 to the air gap 27 for producing an open bridge spoke-type configuration. Preferably, the open bridge 54 extends perpendicular (e.g., radially) between the outer circumference 30 of the rotor 22 and each aperture of the third set of apertures 44. As a result, a region in each respective spoke above the second set of permanent magnets 46 is structurally separated from one another by a respective open bridge. The configuration of the internal bridge 52 allows each lamination 18 to be formed as a single piece structure as opposed to a plurality of multi-piece segments integrated together. The single-piece lamination structure using the internal bridge spoke-type configuration maintains mechanical stress, reduces bridge saturation flux density, and allows different types of magnets to be used which can minimize the magnet costs, and increase robustness of the magnets, particularly during assembly. The internal bridge 52 maintains the structural integrity of the rotor particularly when the motor is operating at high speed operations (e.g., 15,000 rpm or greater). As a result, this configuration is suitable for high speed operations while having the comparable torque and power density of a conventional motor. As a result, a single-piece construction lamination structure minimizes part cost, assembly cost, and waste cost.

Figure 8:
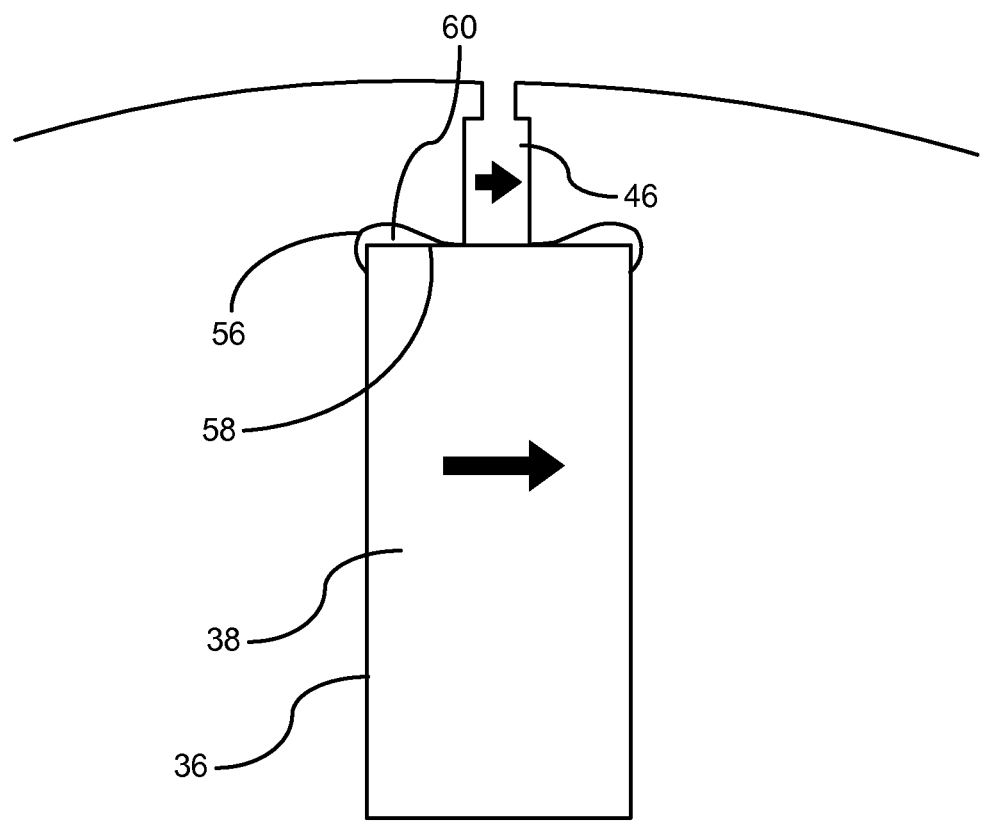
FIG. 8 is a rotor configuration utilizing a demagnetization feature.

FIG. 8 illustrates a dual magnet configuration utilizing a demagnetization feature 56. The first set of permanent magnets 38 are preferably low-cost magnets and second set of magnets 46 are higher performance magnets (i.e., higher performance in comparison to the first set of permanent magnets). As shown in FIG. 8, each of the apertures of the first set 36 is preferably rectangular-shaped for simplicity of assembly and robustness. Each of the apertures of the first set 36 includes a demagnetization feature 56. The demagnetization feature 56 includes a crown-shaped wall on the outermost wall 58 (e.g., radially outward wall) of each aperture of the first set 36 thereby creating an air gap 60 between the magnet inserted therein and the outermost wall 58.

Figure 9:
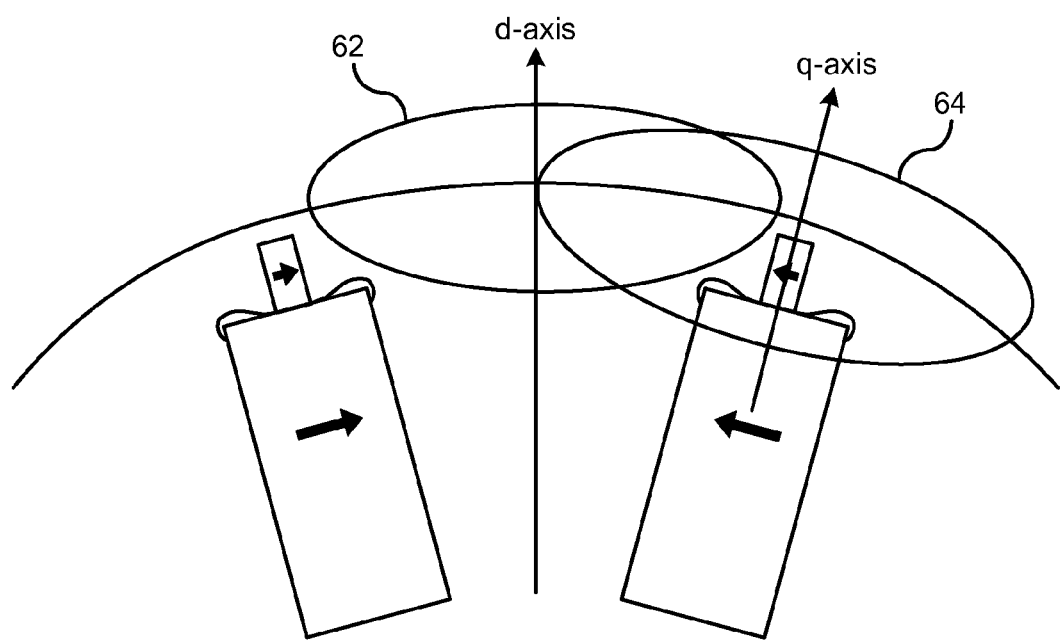
FIG. 9 is an illustration of an exemplary flux-axis path for according to the first embodiment.
Figure 10:
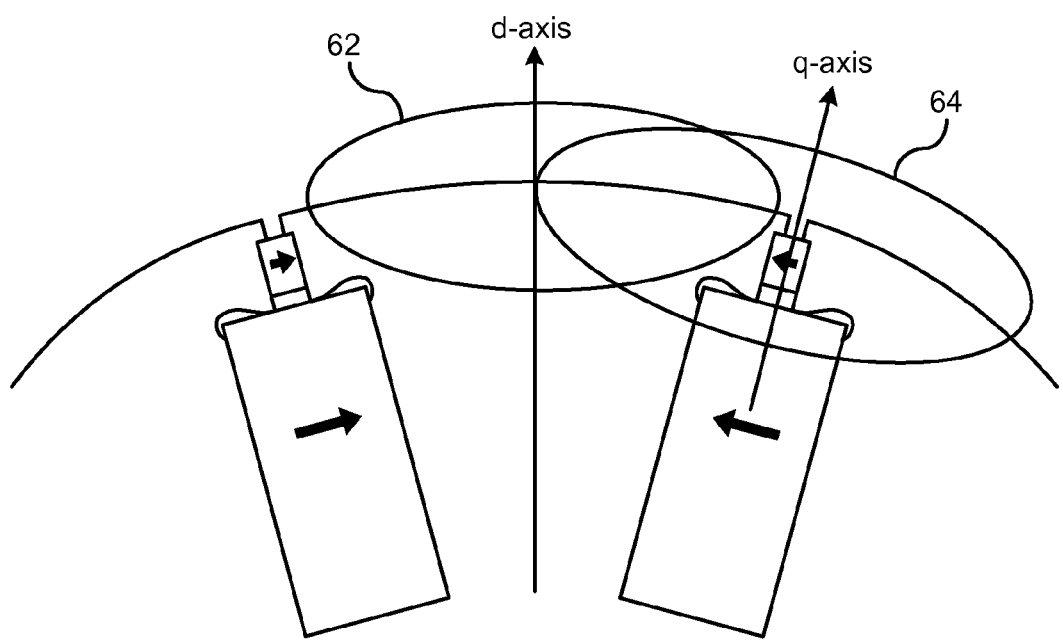
FIG. 10 is an illustration of an exemplary flux-axis path for according to the second embodiment.

FIGS. 9 and 10 illustrate a q-axis flux path 62 and a d-axis flux path 64. As shown in each of the figures, whether utilizing the top bridge or the internal bridge feature along with the demagnetization feature, a lower reluctance q-axis flux path is generated.

Figure 11:
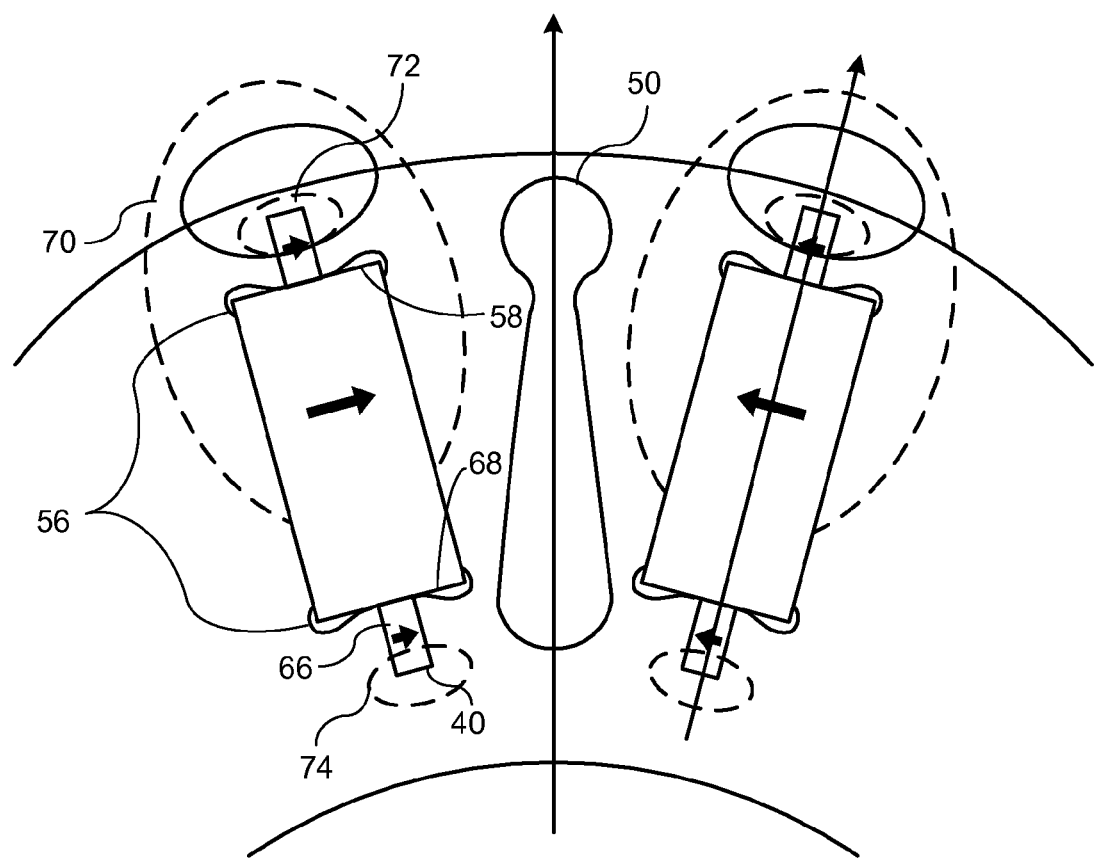
FIG. 11 is an illustration of a rotor assembly according to a third embodiment.

FIG. 11 illustrates a third embodiment where a third set of magnets 66 is utilized. The third set of magnets 66 are disposed in the second set of apertures 40 are preferably a magnet having high residual induction (Br) and low coercivity (e.g., alnico-magnets). This configuration is referred to as a tri-magnet closed bridge spoke-type configuration. The demagnetization feature 56 may be utilized on the outermost radial wall 58 of each aperture of the first set of apertures 40 and also on an innermost radial wall 68 of each aperture of the first set of apertures 40 for affecting the reluctance of the flux path. A flux path 70 is shown for the first set of permanent magnets 38, a flux path 72 is shown for the second set of permanent magnets 46, and a flux path site for is shown for the third set of permanent magnets 66 is shown. The third set of magnets 66 located near the inner rotor radius and the second set of magnets 46 near the outer rotor radius saturates the steel structure therein.

The fourth set of apertures 50 as shown function to enhance the inertia and generate a flux barrier.

It should be understood that the internal bridge configuration as described in FIG. 9 can be utilized with the third set of magnets and the demagnetization features on the inner and outer wall of the first set of apertures as described in FIG. 11.

While certain embodiments of the present invention have been described in detail, those familiar with the art to which this invention relates will recognize various alternative designs and embodiments for practicing the invention as defined by the following claims.

What is claimed is:

1. A rotor of a permanent magnet synchronous machine comprising:
   a rotor core structure including a plurality of stacked laminations;
   a first set of apertures formed in a first radial layer of the rotor core structure;
   a first set of permanent magnets inserted within the first set of apertures forming respective poles within the rotor core structure;
   wherein the first set of apertures includes a demagnetization structure formed on an outermost wall of the first set of apertures, wherein the demagnetization structure forms air gaps between the outermost wall of the first set of apertures and the first set of permanent magnets disposed therein;
   a second set of apertures formed in a second radial layer of the rotor core structure, each pole including an aperture from the second set of apertures, the second set of apertures formed radially inward from the first set of apertures;
   a third set of apertures formed in a third radial layer of the rotor core structure, the third set of apertures is formed radially outward from the first set of apertures;
   a second set of permanent magnets inserted within the third set of apertures, wherein a respective pair of permanent magnets within a pole cooperatively generates a magnetic field in a same direction within the pole, and wherein the magnetic field generated by a pair permanent magnets in a respective pole is opposite to a magnetic field generated by permanent magnets in an adjacent pole; and
   a plurality of bridges each extending across a respective side of each of the third set of apertures in the third radial layer, the plurality of bridges providing structural support of the rotor core structure when operating, the plurality of bridges being integrally formed as single-piece laminations.

2. The rotor of claim 1 wherein the plurality of bridges include top bridges, wherein the top bridges are disposed between the third set of apertures and the outer circumferential edge and extend across an outermost side of each of the third set of apertures.

3. The rotor of claim 2 wherein the wherein the third set of apertures are an extension of the first set of apertures, wherein an air gap is disposed between the first permanent magnet of each respective pole and the second permanent magnet of each respective pole.

4. The rotor of claim 2 wherein the top bridge reduces mechanical stress at speeds in excess of 15000 rpm.

5. The rotor of claim 2 wherein the top bridge reduces torque ripple during rotor operation.

6. The rotor of claim 2 wherein a width of the top bridge is substantially 2 mm or less.

7. The rotor of claim 1 wherein the plurality of bridges include internal bridges, wherein the internal bridges extend across an innermost side of each of the third set of apertures.

8. The rotor of claim 7 further comprising an open air gap formed on an uppermost side of each of the third set of apertures, the air gap extending from the uppermost side of each of the third set of apertures to an outer circumference wall of the rotor structure.

9. The rotor of claim 8 wherein the open air gap extends to an air gap separating the rotor structure and a stator.

10. The rotor of claim 8 wherein the open air gap extends perpendicular from the outermost wall of the third set of apertures and the outer circumference wall.

11. The rotor of claim 8 wherein the internal bridge reduces mechanical stress at speeds in excess of 15000 rpm.

12. The rotor of claim 8 wherein the internal bridge reduces torque ripple during rotor operation.

13. The rotor of claim 1 wherein the first set of apertures includes a demagnetization structure formed on an innermost wall of the first set of apertures, wherein the demagnetization structure forms air gaps between the innermost wall of the first set of apertures and the first set of permanent magnets disposed therein.

14. The rotor of claim 1 further comprising a third set of permanent magnets inserted within the second set of apertures in the second radial layer.

15. The rotor of claim 14 wherein each of the permanent magnets within the pole cooperatively generates a magnetic field in the same direction within the pole, and wherein the magnetic field generated by the permanent magnets in the respective pole is opposite to the magnetic field generated by permanent magnets in the adjacent pole.

16. The rotor of claim 15 wherein the first set of apertures includes a first demagnetization structure and a second demagnetization structure, wherein the first demagnetization structure is formed on an outermost wall of the first set of apertures, wherein the first demagnetization structure forms air gaps between the outermost wall of the first set of apertures and the first set of permanent magnets disposed therein, wherein the second demagnetization structure is formed on an innermost wall of the first set of apertures, wherein the second demagnetization structure forms air gaps between the innermost wall of the first set of apertures and the first set of permanent magnets disposed therein.

17. The rotor of claim 15 wherein each respective aperture in the second radial layer of the rotor core structure are radially aligned with a respective aperture in the first radial layer of the rotor core structure.

18. The rotor of claim 15 wherein each respective aperture in the first radial layer of the rotor core structure are radially aligned with a respective aperture in the third radial layer of the rotor core structure.

19. The rotor of claim 1 further comprising a fourth set of apertures in the rotor core structure, the fourth set of apertures disposed between each respective pole, the fourth set of apertures reducing the weight of the rotor core structure.

20. The rotor of claim 1 wherein the plurality of permanent magnets in the first radial layer have a residual flux density and coercive force higher than the plurality of permanent magnets in the third radial layer.

21. The rotor of claim 1 wherein the rotor core structure includes a plurality of single piece spoke-type stacked laminations.

22. The rotor of claim 21 wherein each lamination includes a plurality of spokes, each spoke is formed between each juxtaposed pair of apertures of the second set of apertures, the spoke including a main body portion that is substantially rectangular.

23. The rotor of claim 22 wherein the main body portion of each spoke is of a respective length to saturate the spoke for minimizing the amount of magnetic flux to pass through, and wherein the main body portion of each spoke is of a respective width for minimizing mechanical stress exerted on each respective stacked lamination.

* * * * *